Oct. 14, 1947.  W. McARTHUR  2,429,190
LOCKING DEVICE FOR SEATS AND THE LIKE
Filed Sept. 15, 1944  3 Sheets-Sheet 1

INVENTOR.
WARREN McARTHUR
BY
ATTORNEY

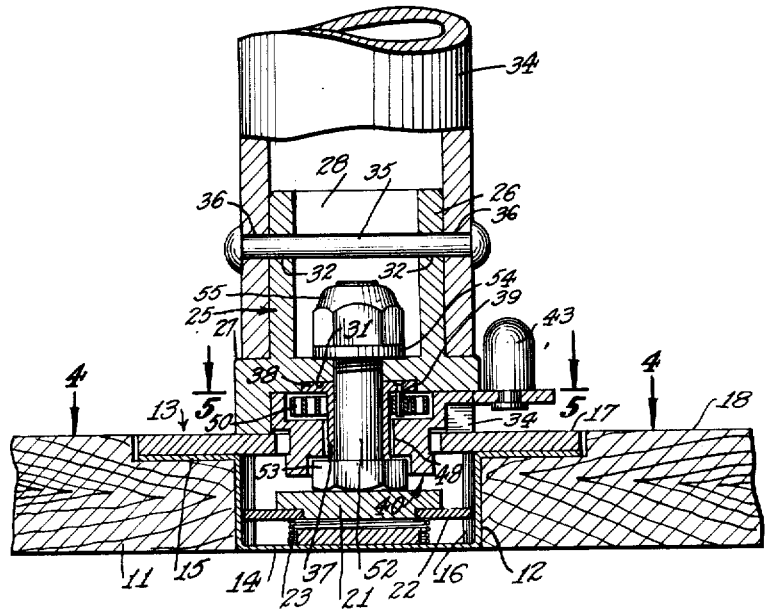
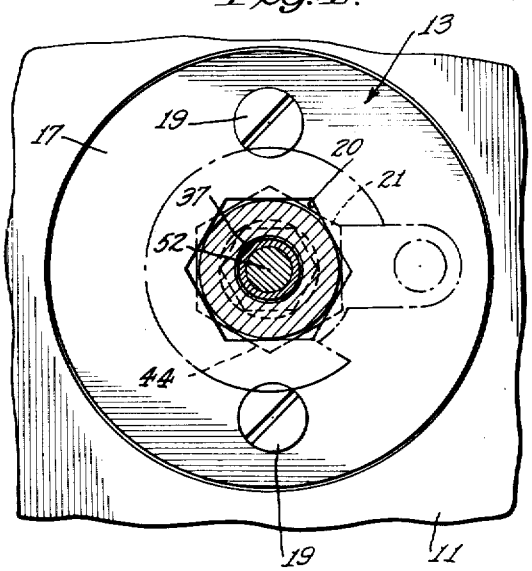
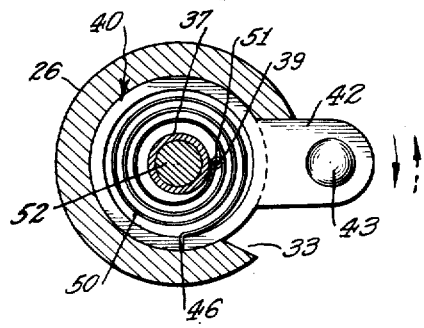

Oct. 14, 1947.     W. McARTHUR     2,429,190
LOCKING DEVICE FOR SEATS AND THE LIKE
Filed Sept. 15, 1944     3 Sheets-Sheet 3
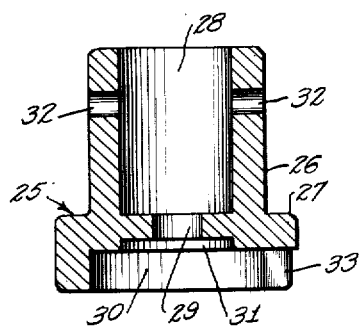
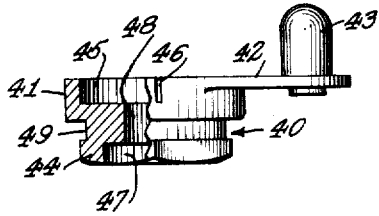
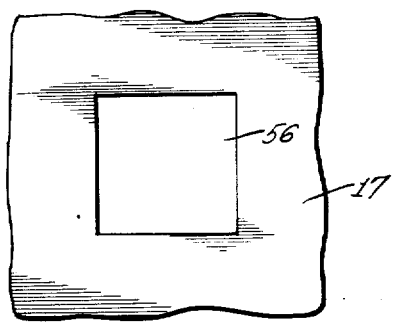
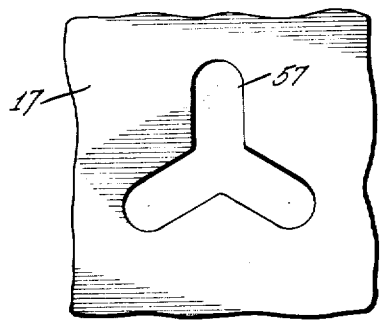
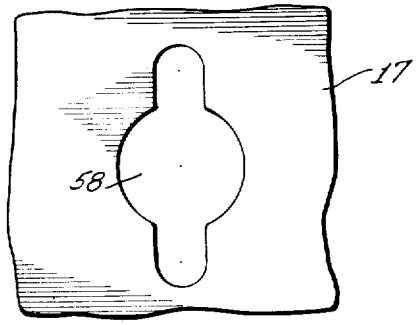
INVENTOR.
WARREN McARTHUR
BY
*F. J. Pisarra*
ATTORNEY Patented Oct. 14, 1947

2,429,190

UNITED STATES PATENT OFFICE 2,429,190

LOCKING DEVICE FOR SEATS AND THE LIKE

Warren McArthur, Bantam, Conn., assignor, by mesne assignments, to Warren McArthur Corporation, a corporation of New York Application September 15, 1944, Serial No. 554,283

6 Claims. (Cl. 45—137)

This invention relates to a locking device and more particularly to such a device for detachably securing a seat or the like in various types of vehicles, such as airplanes, railroad cars and buses.

It is the primary object of this invention to provide a locking device for removably attaching an article of furniture, such as a seat, to a floor or wall of a vehicle in a manner that it may be readily locked in position and subsequently detached without the use of tools.

Another object of the invention is to provide a device of the character indicated which remains in locked position and does not become disengaged due to vibrations, jars or impacts incident to the movement of the vehicle.

Another object of the invention is to provide a locking device that is especially well suited for use in pressurized vehicles, such as airplanes that are flown at high altitudes.

A further object of the invention is to provide a locking device having a first unit thereof more or less permanently secured to a floor or wall and so constructed and arranged as to have its outer surface substantially flush with the exposed surface of the floor or wall and a second unit secured to the leg of a seat or the like. When the second unit is detached from the first unit, said first unit does not constitute an obstruction in the exposed surface of the floor or wall.

A still further object of the invention is to provide a locking device of the type indicated which is simple in design, sturdy in construction, inexpensive to manufacture, and trouble-free in operation.

For the purpose of describing the instant invention, the detailed description that follows is directed to the use of the invention in securing a seat leg to the floor of a vehicle. It is to be fully understood, however, that this invention may be readily and advantageously employed in removably attaching a chair or other article to a wall or the ceiling of a vehicle or other structure as desired. For example, due to the location of heater ducts, the curve contour of the side walls and the like in a vehicle, it may be inconvenient at times to secure the outboard side of a seat directly to the floor. In such cases, the outboard side of the seat is attached to the wall of the vehicle by my locking device. Additionally, the device of this invention may be used to detachably suspend a rack or the like from the ceiling of a vehicle. As will be apparent to persons skilled in the art, the apparatus of this invention may be readily employed in other locales for the purposes indicated.

The locking device of this invention may be considered as consisting of two separate units that may be readily placed into and out of locking engagement. The first of these units is adapted to be attached to the floor of a vehicle while the second unit is adapted to be affixed to a leg of a seat. The first unit comprises a closed receptacle that is disposed in an aperture formed in the vehicle floor and includes a top wall or lock plate having its outer surface substantially flush with the exposed surface of the floor. The lock plate is provided with an opening having a predetermined configuration other than circular. A closure is yieldingly positioned within the lock plate opening and is normally maintained substantially flush with the outer surface of the lock plate and the floor. By this arrangement dirt and debris are prevented from entering the receptacle when the same is not in use.

The second unit comprises a housing and a member rotatably supported within the housing and projecting therebelow. The member is formed with a locking head having a configuration corresponding to that of the opening in the lock plate but somewhat smaller in size in order that it may be inserted through the opening. The member is normally urged in one direction of rotation with respect to the housing within predetermined limits by a spiral spring. The units are so constructed and arranged that the locking head does not normally register with the opening in the lock plate. Upon predetermined rotation of the member with respect to the housing against the action of the spring, the locking head is moved to a position where it may be inserted in the opening in the lock plate against the closure. After the locking head is so inserted through the opening in the lock plate and is moved into the interior of the receptacle and upon rotation of the member in the opposite direction, the locking head is disposed in abutting relation with the inner surface of the lock plate. Under these circumstances, the housing rests upon the outer surface of the lock plate and carries the entire load. In order to detach the first unit from the second unit, it is merely necessary to rotate the member by a suitable handle which projects beyond the housing against the action of the spring, whereby the locking head is again positioned so as to register with the opening of the lock plate and may be withdrawn therethrough.

The above enumerated objects, as well as other objects and advantages obtainable by the practice of this invention, will be readily comprehended by persons skilled in the art by reference to the following detailed description taken in conjunction with the annexed drawings which respectively describe and illustrate a preferred embodiment of the device, together with certain modifications, and wherein Figure 1 is a top plan view of one unit of the locking device of this invention mounted in an aperture in a floor;

Figure 3 is a central vertical sectional view of the locking device of this invention, illustrating one relative position of the various parts;

Figure 4 is a plan view taken along line 4—4 of Figure 3;

Figure 5 is a plan view taken along line 5—5 of Figure 3;

Figure 6 is a central vertical sectional view through the housing of the upper unit of this invention;

Figure 7 is an elevational view, partly in vertical central section, of a member employed in this invention; and Figures 8, 9 and 10 each depict modifications of the opening in the lock plate.

Figure 1:
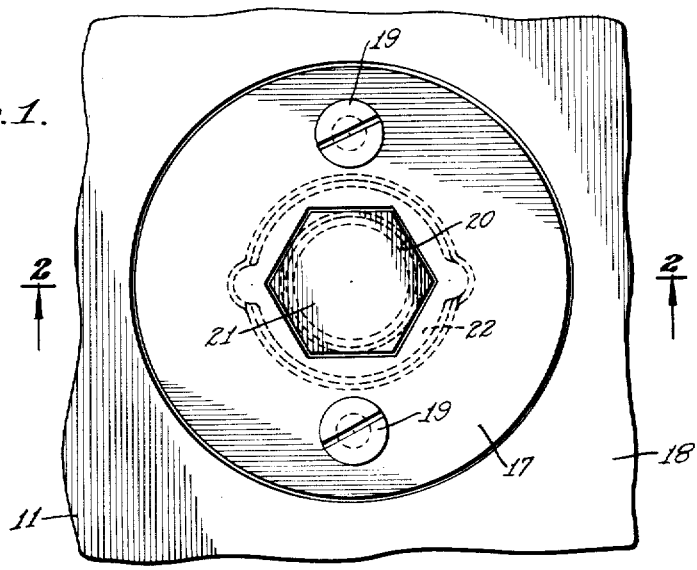
Figure 2:
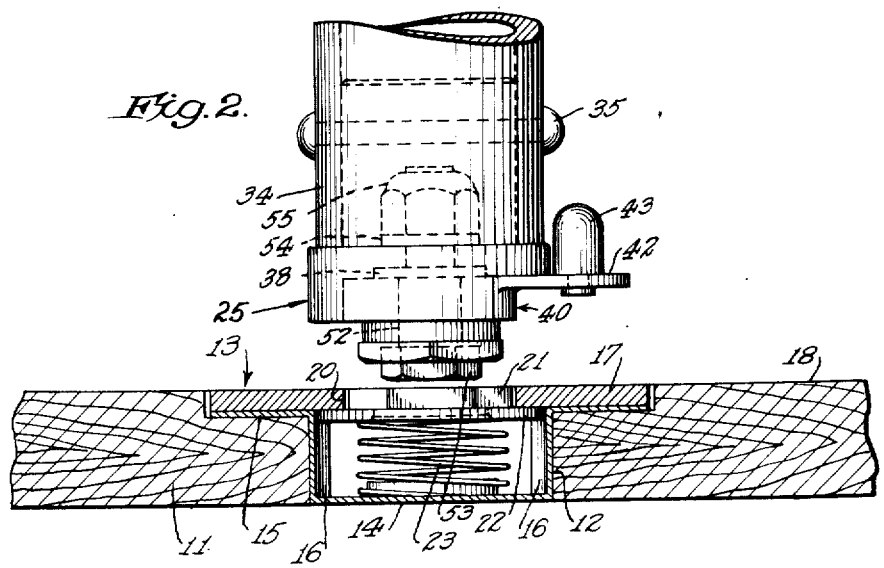
Figure 2 is a vertical sectional view taken along line 2—2 of Figure 1, the other unit of the device being illustrated in elevation above said one unit.

Referring now to the drawings wherein like reference numerals are employed to designate corresponding parts in the several views, and more particularly to Figures 1 and 2, a portion of a vehicle floor 11 is provided with an aperture 12. One unit of the locking device is generally denoted by numeral 13 and is contained within aperture 12. Unit 13 includes a closed receptacle consisting of a generally cylindrical hollow base 14, having a radial flange 15 and formed with a pair of diametrically opposed vertical grooves 16, and a removable top wall or lock plate 17. Plate 17 bears upon flange 15 and is so arranged that its upper surface is substantially flush with the exposed surface 18 of floor 11. Unit 13 is attached to the floor by a plurality of screws 19 which extend through plate 17 and flange 15. Extending through plate 17 is a central opening 20 which is preferably hexagonal in configuration but which may be of any desired configuration other than circular for the purposes of this invention. A hexagonal closure 21 that is slightly smaller in size than opening 20 is adapted to register therewith. Secured to the under-surface of closure 21, by welding or in any other suitable manner, is a pair of bars 22 that extend into vertical grooves 16. Bars 22 serve a dual function, namely, first, to limit upward travel of closure 21 to the position illustrated in Figure 2, and secondly, to coact with vertical grooves 16 in maintaining the closure in registering alignment with opening 20. A compression spring 23 bears against base 14 and bars 22 to normally maintain closure 21 in opening 20 as shown in Figure 2.

The other unit of my locking device is generally denoted by numeral 25 and includes a housing 26 that is best shown in Figure 6 and that is provided with an annular outer shoulder 27. The interior of housing 26 is axially bored on several diameters to obtain a nut compartment 28, a bolt passage 29 and a pair of recesses 30 and 31. Housing 26 is also provided with a pair of diametrically opposed rivet openings 32 and an arcuate groove 33. A tubular chair leg 34 is adapted to receive the upper portion of housing 26 and bear against shoulder 27. The housing is attached to leg 34 by means of a rivet 35 which passes through rivet openings 32 in the housing and aligning openings 36 in the leg (Figure 3).

A cylindrical sleeve 37 is formed with a radial flange 38 that carries a depending pin 39. Flange 38 is of such size as to be received in recess 31 of the housing in a manner that the peripheral surface thereof is in snug frictional engagement with the corresponding portion of the recess.

A member 40 which will now be described in detail is rotatably mounted on sleeve 37 and in recess 30 of housing 26. As is shown in Figure 7, member 40 consists of a main body 41, a laterally projecting arm 42 carrying an operating handle 43 and a hexagonal locking element or head 44 that may be formed integral with body 41 or may be a separate item rigidly attached to body 41 in any manner known to the art. Locking element 44 is a little smaller in size than opening 20 and may, if desired, be of the same size as closure 21. Member 40 is formed with an upper recess or spring compartment 45, a radial slot 46, a lower recess or bolt head compartment 47, a central passage 48 and an annular groove 49. The diameter of passage 48 is greater than the outer diameter of sleeve 37. The diameter of the portion of the member directly above locking element 44 is somewhat smaller than the diameter of a circle inscribed in opening 20.

A spiral spring 50 is positioned in spring compartment 45. This spring is provided with a loop 51 at its inner end to receive pin 39 and is bent outwardly at its outer end to fit in slot 46 in member 40. Member 40 and associated items of equipment are secured to housing 26 by a bolt 52 having a head 53, a lock washer 54 and a nut 55.

In assembling the above described second unit, spring 50 is placed in spring compartment 45 with its outer end engaged in slot 46 and sleeve 37 is inserted downwardly through passage 48 so that pin 39 is admitted into loop 51 of the spring. Sleeve 37 is rotated a few turns with respect to member 40 in order to store energy within spring 50. The sleeve and member are then introduced into the lower end of housing 26 so that flange 38 of the sleeve is snugly engaged in recess 31, member 40 is positioned in recess 30, and lever 42 extends through groove 33 to the exterior of housing 26. Bolt 52 is next passed through sleeve 37 and passage 29 in housing 26 and is drawn up through the coaction of lock washer 54 and nut 55. By virtue of this arrangement, as illustrated in Figure 3, bolt head 53 bears against the lower end of sleeve 37 and assists in preventing rotational or other movement of the sleeve with respect to housing 26. It will be observed, however, that member 40 is rotatable with respect to sleeve 37 as allowed by lever 42 and groove 33. After this unit is assembled as above set forth, the chair leg 34 is telescoped on the upper portion of housing 26 and is attached thereto by means of rivet 35.

When the units of my locking device are separated, as shown in Figure 2, the normal relationship of upper unit 25 to lower unit 13 is such that locking element 44 is not in registering alignment with opening 20 in the lock plate. Lever 42 and therefore member 40 are rotatable through a 30 degree angle as allowed by arcuate groove 33. Due to the action of spring 50, lever 42 is normally urged to the position illustrated in Figure 5. Upon actuation of handle 43, lever 42 and member 40 may be rotated in the direction indicated by the full arrow in Figure 5 through an angle of 30 degrees as allowed by groove 33 against the action of spring 50. When member 40 is rotated to this position, locking element 44 is disposed in registering alignment with opening 20 and may be moved downwardly and into unit 13, thereby correspondingly pressing closure 21 into the receptacle against the action of spring 23 as shown in Figure 3. Upon the release of handle 43, member 40 and locking element 44 are rotated by spring 50 in the direction indicated by the broken arrow in Figure 5 to their normal position, thereby again effecting non-registering alignment between locking element 44 and opening 20. It will be noted from an inspection of the drawings and particularly Figures 3 and 4, that locking element 44 when in the last named position will have its corners in abutting relation with the under-surface of plate 17 to effect engagement between the units. The units may be readily disengaged by actuating handle 43 to rotate lever 42 in the direction indicated by the full arrow in Figure 5 against the action of spring 50, whereby locking element 44 is again positioned in registering alignment with opening 20 and may be withdrawn therethrough.

As above described opening 20 in lock plate 17, closure 21 and locking element 44 are all hexagonal in configuration. It is to be understood that opening 20 may be of any desired configuration, other than circular, and that closure 21 and locking element 44 may be of corresponding shape. By way of illustration, I have indicated various other types of openings in lock plate 17 in Figures 8, 9 and 10. In Figure 8 opening 56 is square in configuration and corresponds to opening 20. When a square opening 56 is employed, it is recommended that a square closure and a square locking element be used in place of those shown in Figure 2. Similarly, when opening 57 or 58, as illustrated in Figures 9 and 10, respectively, is used, the closure in unit 13 and the locking element in unit 25 should be of corresponding configuration but somewhat smaller in size.

Based on the foregoing, it is believed that the objects, advantages and construction of my instant invention will be readily apparent to persons skilled in the art. It is to be borne in mind, however, that various changes in the apparatus herewith illustrated and described may be resorted to without departing from the spirit of this invention or the scope of the subjoined claims.

I claim:

1. In a device of the character described, a first unit comprising a receptacle having a non-circular opening through a wall thereof, a closure, and means for normally and yieldingly maintaining the closure in the opening, and a second unit comprising a support and a locking element rotatably connected to the support, said locking element being non-circular in cross section and of a size slightly smaller than the opening so that it will pass through the opening in opposition to the closure and against the action of said means and engage the under side of said wall upon predetermined rotation with respect to said wall.

2. In a device of the character described, a first unit comprising a receptacle having a non-circular opening through a wall thereof, a closure, and means for normally and yieldingly maintaining the closure in the opening, and a second unit conmprising a housing, a member rotatably secured to the housing, and a locking element carried by and rotatable with the member and disposed beyond the housing, said locking element being non-circular in cross section and of a size slightly smaller than the opening so that it will pass through the opening in opposition to the closure and against the action of said means and engage the under side of said wall upon predetermined rotation with respect to the housing.

3. In a device of the character described, a first unit comprising a receptacle having a non-circular opening through a wall thereof, a closure, and means for normally and yieldingly maintaining the closure in the opening, and a second unit comprising a housing, a member rotatably secured to the housing, spring means within the housing for normally imparting rotation to the member in one direction, and a locking element carried by and rotatable with the member and disposed beyond the housing, said locking element being non-circular in cross section and of a size slightly smaller than the opening so that it will pass through the opening in opposition to the closure and against the action of said first mentioned means and engage the under side of said wall upon predetermined rotation with respect to the housing.

4. In a device of the character described, a first unit comprising a receptacle having a non-circular opening through a wall thereof, a closure, and means for normally and yieldingly maintaining the closure in the opening, and a second unit comprising a housing, a member rotatably secured to the housing, spring means within the housing for normally imparting rotation to the member in one direction, means operable from the exterior of the housing for imparting rotational movement to the member with respect to the housing against the action of the spring means, and a locking element carried by and rotatable with the member and disposed beyond the housing, said locking element being non-circular in cross section and of a size slightly smaller than the opening so that it will pass through the opening in opposition to the closure and against the action of said first mentioned means and engage the under side of said wall upon predetermined rotation with respect to the housing.

5. In a device of the character described, a first unit comprising a closed receptacle including a substantially planar wall having a non-circular opening extending therethrough, a closure, and a spring wholly within the receptacle for normally and yieldingly maintaining the closure in the opening in a manner that a surface of the closure is substantially flush with the outer surface of said wall, and a second unit comprising a housing, a locking element rotatably connected to the housing, and means for imparting rotation to the locking element from the exterior of the housing, said locking element being non-circular in cross section and of a size slightly smaller than the opening so that it will pass through the opening in opposition to the closure and against the action of said spring and engage the under side of said wall upon predetermined rotation with respect to the housing.

6. In a device of the character described, a first unit comprising a closed receptacle including a substantially planar wall having a non-circular opening extending therethrough, a closure, and a spring wholly within the receptacle for normally and yieldingly maintaining the closure in the opening in a manner that a surface of the closure is substantially flush with the outer surface of said wall, and a second unit comprising a housing, a locking element rotatably connected to the housing, resilient means within the housing for normally imparting rotation to the locking element in one direction, means operable from the exterior of the housing for imparting rotational movement to the locking element with respect to the housing against the action of the resilient means, said locking element being non-circular in cross section and of a size slightly smaller than the opening so that it will pass through the opening in opposition to the closure and against the action of said spring and engage the under side of said wall upon predetermined rotation with respect to the housing.

WARREN McARTHUR.

REFERENCES CITED

The following references are of record in the file of this patent:

UNITED STATES PATENTS

| Number | Name | Date |
| --- | --- | --- |
| 2,211,586 | Schwarz | Aug. 13, 1940 |
| 1,360,613 | Baia | Nov. 30, 1920 |
| 1,480,530 | Carr | Jan. 8, 1924 |
| 2,235,949 | Shaw | Mar. 25, 1941 |
| 2,364,288 | Haggerty | Dec. 5, 1944 |

FOREIGN PATENTS

| Number | Country | Date |
| --- | --- | --- |
| 288,026 | Great Britain | Apr. 5, 1928 |
| 619,496 | Germany | Oct. 2, 1935 |

Certificate of Correction

Patent No. 2,429,190 — October 14, 1947

WARREN McARTHUR

It is hereby certified that the above numbered patent was erroneously issued to "Warren McArthur Corporation, a corporation of New York, as assignee by mesne assignments"; whereas said patent should have been issued to *Reconstruction Finance Corporation, of New York, N. Y., a corporation of the United States, assignee by mesne assignments*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.* sure, and a spring wholly within the receptacle for normally and yieldingly maintaining the closure in the opening in a manner that a surface of the closure is substantially flush with the outer surface of said wall, and a second unit comprising a housing, a locking element rotatably connected to the housing, resilient means within the housing for normally imparting rotation to the locking element in one direction, means operable from the exterior of the housing for imparting rotational movement to the locking element with respect to the housing against the action of the resilient means, said locking element being non-circular in cross section and of a size slightly smaller than the opening so that it will pass through the opening in opposition to the closure and against the action of said spring and engage the under side of said wall upon predetermined rotation with respect to the housing.

WARREN McARTHUR.

REFERENCES CITED

The following references are of record in the file of this patent:

UNITED STATES PATENTS

| Number | Name | Date |
|---|---|---|
| 2,211,586 | Schwarz | Aug. 13, 1940 |
| 1,360,613 | Baia | Nov. 30, 1920 |
| 1,480,530 | Carr | Jan. 8, 1924 |
| 2,235,949 | Shaw | Mar. 25, 1941 |
| 2,364,288 | Haggerty | Dec. 5, 1944 |

FOREIGN PATENTS

| Number | Country | Date |
|---|---|---|
| 288,026 | Great Britain | Apr. 5, 1928 |
| 619,496 | Germany | Oct. 2, 1935 |

Certificate of Correction

Patent No. 2,429,190 — October 14, 1947

WARREN McARTHUR

It is hereby certified that the above numbered patent was erroneously issued to "Warren McArthur Corporation, a corporation of New York, as assignee by mesne assignments"; whereas said patent should have been issued to *Reconstruction Finance Corporation, of New York, N. Y., a corporation of the United States, assignee by mesne assignments*;

and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*